Patented Dec. 1, 1953

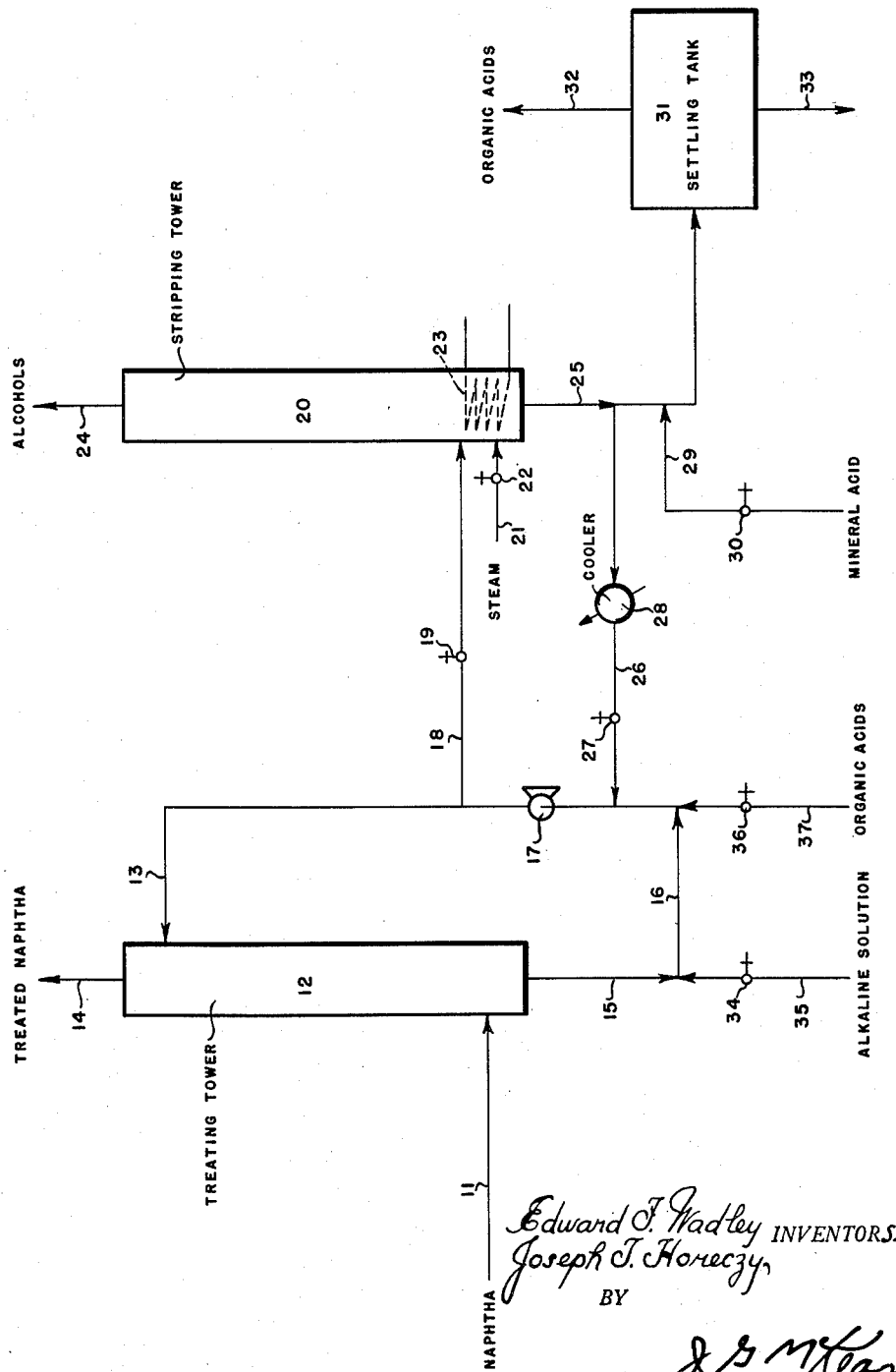

2,661,362

UNITED STATES PATENT OFFICE 2,661,362

REMOVAL OF OXYGENATED ORGANIC COMPOUNDS FROM HYDROCARBONS

Edward F. Wadley, Baytown, and Joseph T. Horeczy, Cedar Bayou, Tex., assignors, by mesne assignments, to Standard Oil Development Company, Elizabeth, N. J., a corporation of Delaware Application November 26, 1947, Serial No. 788,231

3 Claims. (Cl. 260—450)

The present invention is directed to a method for removing oxygenated organic compounds from hydrocarbons containing them. More particularly, the invention is directed to the treatment of hydrocarbons obtained by reacting carbon monoxide and hydrogen in the presence of a catalyst.

The pioneering work by Fischer and Tropsch resulted in a process for producing hydrocarbons and oxygenated organic compounds from carbon monoxide and hydrogen by passing a mixture thereof over a suitable catalyst to cause a reaction between the materials. As a result of this work, commercial processes have been developed to produce hydrocarbons and oxygenated organic compounds from carbon monoxide and hydrogen. The product from this synthesis reaction is a synthetic crude petroleum, but, unlike natural crude petroleum, it may contain a considerable quantity of oxygenated organic compounds such as the ketones, aldehydes, organic acids, esters, and various other oxygenated hydrocarbon derivatives. These oxygenated organic compounds in themselves are valuable materials, but, in combination with hydrocarbons, they are objectionable since the hydrocarbons are contaminated by the oxygenated organic compounds and, therefore, are unsuitable for use in the various petroleum conversion processes where catalysts are employed.

The reason that the synthetic hydrocarbons produced by the reaction of carbon monoxide and hydrogen and contaminated with oxygenated organic compounds are unsuitable in catalytic conversion processes is that the oxygenated organic compounds react with the catalyst usually employed, such as the Friedel-Crafts type catalyst. Not only do the oxygenated organic compounds react with the catalyst but they enter into reaction with the hydrocarbons and produce products of a less attractive nature than the product resulting from the catalytic conversion of the hydrocarbons themselves. For example, polymers having lubricating oil qualities may be produced by polymerizing alpha olefins in the presence of aluminum chloride, but, if these alpha olefins are contaminated with oxygenated organic compounds, as when produced from carbon monoxide and hydrogen, the product is not satisfactory in that the lubricating oil qualities are depreciated by the presence of the oxygenated organic compounds. Furthermore, the oxygenated organic compounds react with the catalyst and destroy its activity requiring considerably larger quantities of catalyst to cause the reaction to proceed than would be required if the oxygenated organic compounds were absent.

The problem of removing oxygenated organic compounds from naphthas formed by the reaction of carbon monoxide and hydrogen has long been recognized and numerous suggestions have been made for removing these compounds. The prior art proposals have included treatment of the naphthas with an adsorbent such as silica gel, solvent extraction with aqueous methanol, and various other solvents such as sulfur dioxide and the like and mixtures thereof. It has also been suggested to remove a portion of the oxygenated organic compounds by treatment of the naphtha with various chemical reagents. It has also been known to treat compounds including hydrocarbons and oxygenated organic compounds with aqueous solutions of alkali metal hydroxide to remove oxygenated organic compounds therefrom. The prior art proposals have largely been unsatisfactory in that, while they are effective in removing a portion of the oxygenated organic contaminants in the naphtha, they are largely ineffective in substantially completely removing the oxygenated organic compounds.

It is, therefore, the object of the present invention to provide a process for removing oxygenated organic compounds from naphthas containing them.

We have now discovered that the oxygenated organic compounds in hydrocarbon mixtures, such as produced by the synthesis of carbon monoxide and hydrogen, may be removed from the synthetic naphthas by subjecting the naphtha containing the oxygenated organic compounds to a treating operation including a treatment with an aqueous solution of an alkali metal hydroxide to which has been added or which contains an organic acid of the type of the carboxylic acids.

The present invention involves treating the naphtha with an alkaline solution containing the organic carboxylic acid to remove effectively organic acids contained therein and alcohols, leaving the naphtha substantially free of these compounds. The naphtha is separated from the treating solution and then may be used in catalytic conversion operations such as polymerization and alkylation and the like. The separated solution containing dissolved organic acids may be recycled to treat additional quantities of the contaminated naphtha wholly or in part. Preferably, in order to recover the desirable alcohols and organic acids contained in the fattened solution, only a portion of the treating solution containing the dissolved acids and alcohols is recycled to contact with additional quantities of the naphtha and another portion is withdrawn and subjected to a steam stripping operation for recovery of the alcohols. After being stripped of alcohols, the stripped aqueous solution of alkali metal hydroxide may be divided into two portions with one portion being cooled and returned to treat additional quantities of the contaminated naphtha while the other portion may be acidified with a mineral acid to recover the dissolved organic acids.

The alkaline solution employed as a treating reagent may be an aqueous solution of an alkali metal hydroxide or it may be an aqueous solution of an alkali metal carbonate. The hydroxides and carbonates of the alkali metals, such as lithium, sodium, and potassium, may be suitably employed in the practice of the present invention. Preferably, it will be desired to employ an aqueous solution of an alkali metal hydroxide containing an amount of alkali metal hydroxide in the range from about 5% to about 20%. A solution containing 15% of sodium hydroxide gives very good results.

The temperatures employed in the practice of the present invention in which the contaminated naphtha containing oxygenated organic compounds is contacted with an aqueous alkaline solution to which has been added an organic carboxylic acid will usually include temperatures in the range from about 60° F. to 120° F. with temperatures in the preferred range from about 80° F. to 100° F.

In order to remove the alcohols from the fattened solution, it will be desired to strip the fattened solution with open steam at a temperature in the range from 212° F. to 350° F., depending on the pressure employed on the system. It will be understood that in the treating step a suitable pressure may be imposed to maintain a liquid phase condition.

The invention will now be further illustrated by reference to the drawing in which the sole figure represents a flow sheet of a preferred mode of practicing the present invention. Referring now to the drawing, numeral 11 designates a charge line through which a naphtha fraction boiling in the range between 100° F. and 400° F., produced by the synthesis of carbon monoxide and hydrogen over a catalyst, is introduced into the system. The naphtha fraction introduced by line 11 contains olefins, paraffins, and naphthenes and may be contaminated with oxygenated organic compounds including ketones, alcohols, aldehydes, organic acids, esters, and the like. The naphtha is introduced into a treating tower 12 which may suitably be a tower equipped with internal baffling arrangements, such as bell cap plates, which will allow intimate contact between one liquid and another liquid. The alkaline solution, such as a solution of sodium hydroxide and water, having a concentration of sodium hydroxide of about 15% and containing approximately 10% of an organic acid, such as an organic acid having from 3 to 12 carbon atoms, is introduced into treating tower 12 by line 13. The alkaline solution containing the organic carboxylic acid flows downwardly in treating tower 12 and contacts countercurrently the ascending hydrocarbons. The hydrocarbons, substantially free of organic acids and alcohols, leave treating tower 12 by line 14 and may then be used as a feed stock for a catalytic conversion operation, such as polymerization operation employing a Friedel-Crafts type catalyst. The fattened solution containing the original dissolved carboxylic acid and including alcohols and organic acids removed from the contaminated naphtha is withdrawn from treating tower 12 by line 15 and is recycled in part to treating tower 12 by way of branch line 16 which meets line 13. Pump 17 forces the solution back into the top of tower 12. A portion of the fattened solution containing dissolved organic acids and alcohols may be routed by way of line 18 controlled by valve 19 to a stripping tower 20. Stripping tower 20 is provided with a line 21 controlled by valve 22 by way of which open steam may be introduced thereto. Stripping tower 20 is also provided with a heating means 23 which may either be an internal or external reboiler.

In stripping tower 20, conditions are adjusted which will include a temperature in the range between 212° F. and 350° F., depending on the pressure, to remove overhead by line 24 alcohols which were dissolved in the fattened solution. While not shown in the drawing, the fraction withdrawn by line 24 will also include water and alcohols and should be subjected to a cooling treatment to condense these materials for recovery thereof. While not illustrated in the drawing, it may be desirable to provide stripping tower 20 with a line through which water may be introduced to maintain the proper concentration of water in the solution. Otherwise, the solution may become depleted of water if water is not added.

The substantially alcohol-free aqueous alkaline solution containing the dissolved organic acids and the acids originally added is discharged from stripper 20 by line 25 and split into two streams. One stream flows through line 26, controlled by valve 27, after cooling in cooler 28 into line 13 for recycling to treating tower 12 as a treating reagent, as has been described.

The other portion discharged by way of line 25, after acidification with a mineral acid introduced by line 29 and which is controlled by valve 30, into a settling tank 31 wherein a separation between organic acids and the salt solution is made, the organic acids separating as a top layer. The organic acids may be withdrawn from tank 31 by line 32 for addition of a portion thereof to the treating solution, as will be described, or it may be used as such as a starting point in numerous organic syntheses. The salt solution may be discharged from the system by line 33.

To compensate for the solution which is acidified and subsequently discharged from the system by line 33, it will be necessary from time to time to add make-up alkaline solution. Under these conditions, it will be convenient to add the make-up alkaline solution by opening valve 34 in line 35 which meets with line 15 and connects into branch line 16 and allows the make-up alkaline solution to recycle to treating tower 12 as has been described. At the beginning of the operation in accordance with the present invention, the treating solution introduced by line 13 will not contain any of the agents which will promote the solubility of the organic acids and alcohols in the aqueous alkaline solution. Therefore, from time to time it may be necessary to augment the supply of organic carboxylic acids by opening valve 36 in line 37 connecting the system to a supply of these materials, not shown.

The organic acids which exert a promoting effect in dissolving the carboxylic acids and alcohols contained in the naphtha and contaminating it may be illustrated by the acids having 3 to 12 carbon atoms, such as, for example, butyric acids, isobutyric acid, valeric acid, hexanoic acid, phenyl acetic acid, the amino-carboxylic acids, and selected naphthenic acids available in certain petroleum fractions and obtained by neutralization of the selected fractions and acidification of the neutralized solution.

The amount of the carboxylic acids added to the aqueous alkaline solution will be in the range from 1% to 20% with a preferred amount of approximately 10%.

As described in conjunction with the drawing, the organic acids will build up in the alkaline solution and it may be desirable to withdraw continuously an amount of the fattened solution from which the alcohols have been removed for acidification with mineral acids for recovery of organic acids therefrom.

The invention will now be illustrated further by specific examples in which a naphtha boiling in the gasoline boiling range and obtained by the reaction of carbon monoxide and hydrogen over an iron-type catalyst was treated. The naphtha was subjected to analysis before treatment and was then contacted with an aqueous solution of sodium hydroxide at about 80° F. under conditions to remove substantial quantities of the alcohols and acids. The treated naphtha was separated from the sodium hydroxide solution and the naphtha was analyzed for its content of acids and alcohols. Another portion of a naphtha produced from carbon monoxide and hydrogen was subjected to a similar treatment. The naphtha solution, in both instances, contained dissolved alcohols and acids which were removed from the naphtha solution and which served to enhance the activity of the alcohols and acids in the sodium hydroxide solution.

The results of these two runs are compared with analysis of the naphtha prior to treatment in accordance with the present invention in the following table:

Table

| | Millimols per Gram | | | |
|---|---|---|---|---|
| | Before Treatment | | After Treatment | |
| | Acids | Alcohols | Acids | Alcohols |
| 1 | 0.688 | 0.547 | .001 | .082 |
| 2 | 0.788 | 1.475 | .007 | .256 |

It will be noted from the data in the foregoing table that the naphtha which contained a low content of acids and alcohols had both of these materials removed in substantial quantities when contacted with a sodium hydroxide solution which contained alcohols and acids from the naphtha itself. In an instance in the second run where the amount of alcohols was trebled over that in the preceding run, again substantial removal of these compounds was effected by contact with the sodium hydroxide solution containing dissolved organic acids and alcohols.

As another example of the practice of the present invention, a naphtha fraction containing organic acids and alcohols and produced by the synthesis of hydrocarbons from carbon monoxide and hydrogen over an iron-type catalyst was contacted with a 15% sodium hydroxide solution and water, to which had been added 5% of iso-butyric acid. As a result of this treatment, the content of alcohols was reduced by an appreciable amount.

The nature and objects of the present invention having been completely described and illustrated, what we wish to claim as new and useful and to secure by Letters Patent is:

1. A method for treating a naphtha fraction contaminated with oxygenated organic compounds consisting of carboxylic acids, alcohols, ketones, and aldehydes, which comprises subjecting said naphtha fraction to contact at a temperature in the range between 60° and 120° F. with an aqueous solution of alkali metal hydroxide to cause substantial removal of carboxylic acids and alcohols therefrom, separating said alkali metal hydroxide solution containing carboxylic acids and alcohols from said naphtha, dividing the separated solution into first and second portions, contacting additional quantities of said feed naphtha with said first portion to cause substantial removal of carboxylic acids and alcohols from said additional quantities of feed naphtha, and recovering from said second portion alcohols and carboxylic acids.

2. A method in accordance with claim 1 in which the alkali metal hydroxide is sodium hydroxide.

3. A method for treating a naphtha fraction contaminated with oxygenated organic compounds consisting of carboxylic acids, alcohols, ketones, and aldehydes which includes the steps of contacting said hydrocarbon with an aqueous solution of sodium hydroxide having a concentration in the range from about 5% to 20% of sodium hydroxide at a temperature in the range between 60° F. and 120° F. to remove substantially carboxylic acids and alcohols therefrom, separating the naphtha fraction from the sodium hydroxide solution, withdrawing the sodium hydroxide solution containing carboxylic acids and alcohols and dividing it into first and second portions, recycling the first portion to contact with additional quantities of the feed naphtha fraction to remove substantially carboxylic acids and alcohols therefrom, subjecting the second portion to a treatment including stripping with steam at a temperature in the range between 212° F. and 350° F. to remove alcohols therefrom, dividing the second portion from which alcohols have been removed into third and fourth portions, cooling the third portion and returning it in admixture at least in part with said first portion to contact additional quantities of said feed naphtha to remove substantially carboxylic acids and alcohols therefrom, acidifying the fourth portion with a mineral acid, and recovering carboxylic acids therefrom.

EDWARD F. WADLEY.
JOSEPH T. HORECZY.

References Cited in the file of this patent

UNITED STATES PATENTS

| Number | Name | Date |
|---|---|---|
| 2,258,500 | Mertens et al. | Oct. 7, 1941 |
| 2,274,750 | Soenksen et al. | Mar. 3, 1942 |
| 2,364,582 | Davis et al. | Dec. 5, 1944 |
| 2,427,212 | Henderson et al. | Sept. 9, 1947 |
| 2,439,670 | Oosterhout | Apr. 13, 1948 |
| 2,470,782 | McGrath et al. | May 24, 1949 |

OTHER REFERENCES

Koch et al.: Brenstoff-Chemie 16, 382 to 387 (1935).

U. S. Naval Tech. Mission in Europe, "The Synthesis of Hydrocarbons and Chemicals From CO and $H_2$," pages 84–85, August 2, 1946.